(12) United States Patent
Turner et al.

(10) Patent No.: US 12,031,542 B2
(45) Date of Patent: Jul. 9, 2024

(54) VACUUM PUMP COMPRISING A RELIEF VALVE AND A METHOD OF ASSEMBLY OF THE RELIEF VALVE

(71) Applicant: Edwards Limited, Burgess Hill (GB)

(72) Inventors: Neil Turner, Burgess Hill (GB); David Alan Turrell, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 105 days.

(21) Appl. No.: 17/608,944

(22) PCT Filed: May 15, 2020

(86) PCT No.: PCT/GB2020/051154
§ 371 (c)(1),
(2) Date: Nov. 4, 2021

(87) PCT Pub. No.: WO2020/229811
PCT Pub. Date: Nov. 19, 2020

(65) Prior Publication Data
US 2022/0299035 A1    Sep. 22, 2022

(30) Foreign Application Priority Data
May 15, 2019  (GB) ...................................... 1906844

(51) Int. Cl.
*F04D 19/04*     (2006.01)
*F04C 23/00*     (2006.01)
(Continued)

(52) U.S. Cl.
CPC ............ *F04D 19/04* (2013.01); *F04C 23/001* (2013.01); *F04C 25/02* (2013.01); *F04C 28/26* (2013.01);
(Continued)

(58) Field of Classification Search
CPC .. F04D 19/04; F04D 27/0215; F04D 15/0011; F16K 15/063; F16K 15/182;
(Continued)

(56) References Cited

U.S. PATENT DOCUMENTS 3,081,936 A * 3/1963 Wessling ................ F16K 15/16
                                                    418/258
4,485,844 A * 12/1984 Vander Kaay ........ F16K 15/026
                                                    137/543.13
(Continued)

FOREIGN PATENT DOCUMENTS

CN    102693908 A    9/2012
EP    0401741 A1    12/1990
(Continued)

OTHER PUBLICATIONS

Combined Search and Examination Report under Sections 17 and 18(3) dated Nov. 1, 2019 from counterpart GB Application No. 1906844.4, 5 pp.
(Continued)

*Primary Examiner* — Phutthiwat Wongwian
*Assistant Examiner* — Susan E Scharpf
(74) *Attorney, Agent, or Firm* — Shumaker & Sieffert, P.A (57) ABSTRACT

A multiple stage rotary vacuum pump comprising: a stator comprising multiple pumping stages; at least one inter-stage divider separating two adjacent pumping stages; the at least one inter-stage divider comprising two walls defining a cavity therebetween, an upstream wall bounding an upstream pumping stage and a downstream wall bounding a downstream pumping stage of the two adjacent pumping stages. The cavity comprising at least a portion of a pressure relief fluid flow path, the pressure relief fluid flow path providing a path from an outlet portion of the upstream stage
(Continued)

towards an inlet portion of the upstream stage or towards an exhaust, the pressure relief fluid flow path comprising an orifice, the orifice comprising a valve seat; and a pressure relief valve configured to move between a compressed and an elongated state, the pressure relief valve sealing the orifice when in the elongated state and being configured to move to the compressed state such that the orifice is not obstructed, in response to pressure in the upstream stage rising above a predetermined value.

9 Claims, 6 Drawing Sheets

(51) Int. Cl.
*F04C 25/02* (2006.01)
*F04C 28/26* (2006.01)
*F04D 15/00* (2006.01)
*F04D 27/02* (2006.01)
*F16K 15/06* (2006.01)
*F16K 15/18* (2006.01)
*F16K 17/04* (2006.01)
*F16K 27/02* (2006.01)

(52) U.S. Cl.
CPC .......... *F16K 15/063* (2013.01); *F16K 15/182* (2021.08); *F16K 17/0466* (2013.01); *F16K 27/0209* (2013.01); *F04D 15/0011* (2013.01); *F04D 27/0215* (2013.01)

(58) Field of Classification Search
CPC ............. F16K 27/0209; F16K 17/0466; F04C 23/001; F04C 25/02; F04C 28/26
See application file for complete search history.

(56) References Cited

U.S. PATENT DOCUMENTS

| | | | |
|---|---|---|---|
| 5,040,949 A | * | 8/1991 | Crinquette .............. F04C 28/02 417/310 |
| 8,821,607 B2 | | 9/2014 | Moriya et al. |
| 2004/0107997 A1 | | 6/2004 | Tom |
| 2018/0251364 A1 | * | 9/2018 | Scott ..................... F16K 15/026 |
| 2019/0031494 A1 | * | 1/2019 | Scott ....................... F16K 17/00 |
| 2019/0360487 A1 | * | 11/2019 | Turner .................. F04C 23/001 |

FOREIGN PATENT DOCUMENTS

| | | |
|---|---|---|
| GB | 580322 | 9/1946 |
| GB | 586710 | 3/1947 |
| JP | 2011202603 A | 10/2011 |
| RU | 2614342 C1 | 3/2017 |
| TW | 201740043 A | 11/2017 |
| WO | 2017178794 A1 | 10/2017 |
| WO | 2018134610 A1 | 7/2018 |

OTHER PUBLICATIONS

International Search Report and Written Opinion dated Jul. 24, 2020 from counterpart International Application No. PCT/GB2020/051154, 12 pp.

First Office Action and Search Report, and translation thereof, from counterpart Chinese Application No. 202080036099.4 dated Jan. 15, 2024, 8 pp.

* cited by examiner

VACUUM PUMP COMPRISING A RELIEF VALVE AND A METHOD OF ASSEMBLY OF THE RELIEF VALVE

This application is a national stage entry under 35 U.S.C. § 371 of International Application No. PCT/GB2020/051154, filed May 12, 2020, which claims the benefit of GB Application No. 1906844.4, filed May 15, 2019, the entire contents of each of which are incorporated herein by reference.

TECHNICAL FIELD

The field of the disclosure relates to a relief valve for a multistage pump assembly and a method of assembling such a valve within an interstage cavity of the pump.

BACKGROUND

Relief or blow off valves within pumping systems to protect the pump against increases in pressure at the pump inlet are provided in many systems. They are subject to wear and may need servicing or replacing, particularly in pumps configured to pump corrosive fluids. In multistage pumps where the valves may be located in the interstage cavity, such valves are difficult to access. To address the issue of valves wearing more quickly than many other components of a pump, cartridge relief valves have been designed which are self-contained, comprise several components and can be inserted as a working unit into the desired location. A drawback of these valves is that the material content and part count for such a cartridge relief valve is quite high.

It would be desirable to provide smaller relief valves with a lower part count, while still allowing for assembly and service of the valves.

SUMMARY

A first aspect provides a multiple stage rotary vacuum pump comprising: a stator comprising multiple pumping stages; at least one inter-stage divider separating two adjacent pumping stages; the at least one inter-stage divider comprising two walls defining a cavity therebetween, an upstream wall bounding an upstream pumping stage and a downstream wall bounding a downstream pumping stage of the two adjacent pumping stages; the cavity comprising at least a portion of a pressure relief fluid flow path, the pressure relief fluid flow path providing a path from an outlet portion of the upstream stage towards an inlet portion of the upstream stage or towards an exhaust, the pressure relief fluid flow path comprising an orifice, the orifice comprising a valve seat; and a pressure relief valve configured to move between a compressed and an elongated state, the pressure relief valve sealing the orifice when in the elongated state and being configured to move to the compressed state such that the orifice is not obstructed, in response to pressure in the upstream stage rising above a predetermined value.

The inventors of the present disclosure recognised that although there are advantages to a cartridge valve assembly that allow easy insertion and removal from the pump for replacement and servicing purposes, there are drawbacks with such an arrangement. In particular, theses cartridges can be relatively large and have a high part count. The inventors of the present disclosure recognised that several of the components of such cartridge assemblies have functions that could be performed by other parts of the machine into which they are inserted. Thus, were the valve assembly configured such that it cooperated with parts of the pump, some of the components could be dispensed with. With this in mind, a valve assembly is provided that has a compressed and elongated state and that is configured to seal with an orifice within the pump when in the elongated state. In this way the valve assembly can be compressed, and inserted into the pump in the compressed state and then released to an elongated state where it seals with the orifice.

Thus, the valve seat is part of the pump itself and it is the valve sealing and biasing means which are the removable component. Providing a portion of a valve that has a compressed non-sealing state, allows it to be inserted into the machine and removed from it, while when elongated it can be held in place.

In some examples, the pressure relief valve comprises retaining means for releasably retaining the valve in the compressed state.

The pressure relief valve may comprise retaining means such that it can be retained in the compressed state. This allows it to be inserted into and removed from the pump without the need to hold it in the compressed state during this procedure.

In some examples, an outer sealing face of the valve comprises a receiving means configured to receive a tool for rotating the outer sealing face to release or engage the retaining means.

The retaining means may releasably engage with a cooperating means and in some cases the method for releasing and retaining may involve relative rotation of two parts of the valve assembly. Such relative rotation may be triggered using a tool that cooperates with a receiving means on the outer sealing face. The outer sealing face may be accessible when the valve is within the pump and allows the valve to be placed in the compressed state and removed for servicing or replacement.

In some examples, the retaining means comprises a hook and a retainer for retaining the hook, one of the hook and retainer being attached to a fixed end of the valve and the other of the hook and retainer to a sealing end, the valve being configured such that rotation of the sealing end of the valve engages or releases the hook from the retainer.

Although the retaining means can be formed in a number of ways, one simple yet effective means is to use a hook and retaining means for the hook, relative rotation between the hook and retaining means allowing them to engage when in the compressed state, and reverse rotation in the compressed state allowing them to disengage and return the valve assembly to the elongated state. In this way, with the use of compression force and a tool to rotate one end of the valve the valve assembly can be moved between the compressed and elongated state within the pump allowing it to be inserted and removed.

In some examples, the orifice is located in one wall of the inter-stage divider and comprises an outlet of the upstream pumping stage.

Although the orifice may be located at a number of different points within the flow path, in some cases it is in the outer wall of the interstage divider. In this position it is relatively easy to access and provides a convenient way of sealing the flow path from the upstream pumping chamber.

In other examples, the cavity comprises a pumping fluid flow path, the pumping fluid flow path providing a path from the outlet portion of the upstream stage towards an inlet portion of the downstream stage, the pumping fluid flow path and the pressure relief fluid flow path comprising the orifice, at a junction of the paths.

In some examples, a portion of the fluid flow path from the outlet portion of the upstream stage to the orifice comprises a combined pressure relief fluid path and pumping fluid flow path.

An alternative arrangement that may provide an effective reuse of flow paths is where the pumping fluid flow path from the upstream stage to the downstream stage and the pressure relief fluid flow path from the outlet of the upstream stage are shared for a portion of their lengths within the cavity. In some cases the orifice is located at the point of divergence between the two paths such that the pressure relief path is blocked when the valve is closed and provides a flow path when the valve is open.

In some examples, the pressure relief valve is configured to extend between the two walls, a fixed end of the valve being mounted in the downstream wall and a sealing end of the valve extending to the upstream wall when the valve is in the elongated state.

Providing a pressure relief valve comprising a sealing face adapted to seal with a valve seat that is part of the pump allows the valve to be made of fewer components and to be relatively compact. In order for it to be stably held in position in use, in some examples the valve extends between the two walls and a spring within the valves pushes the sealing face against the valve seat when in the elongated state.

In some examples, the vacuum pump comprises a recess for receiving the fixed end of the valve.

In order for the valve to be stably retained in this position it may be advantageous if the pump comprises a recess for receiving then end of the valve remote from the sealing end and holding it in a fixed position. In the example where the valve extends between the two walls, the downstream wall may comprise the recess for receiving the fixed end of the valve thereby holding it in position. Where the valve seals an orifice between the pumping fluid flow path and pressure relief fluid flow path, the recess may be in the wall of the pressure relief fluid flow path. In either case, when the valve is compressed using the retaining means it can be removed from the recess and taken out of the pump for servicing.

A second aspect provides a method of assembling a valve within an inter-stage cavity between walls separating two adjacent pumping stages, the method comprising: inserting a pressure relief valve retained in a compressed state by retaining means, between the walls of the inter-stage cavity, the pressure relief valve comprising a sealing end for engaging with a valve seat in an orifice within a pressure relief fluid flow path and an opposing end, the pressure relief fluid flow path passing through the inter-stage cavity and connecting an outlet portion of an upstream stage to an inlet portion of the upstream stage or to an exhaust; locating the valve within the fluid flow path; and releasing the valve from the compressed state such that the valve moves to an extended state and a sealing end of the valve mates with the valve seat in the orifice.

In some examples, the orifice is located in an upstream wall of the cavity; and the locating step comprises locating the opposing end of the valve within a recess in a downstream wall of the inter-stage cavity; and releasing the valve from the compressed state such that the valve moves to an extended state and the sealing end mates with the valve seat in the upstream wall.

In other examples, the orifice is located in a wall of a pumping fluid flow path within the cavity, the orifice linking the pumping fluid flow path and the pressure relief fluid flow path; and the locating step comprises locating the opposing end of the valve within a recess in a wall of the pressure relief fluid flow path; and releasing the valve from the compressed state such that the valve moves to an extended state and the sealing end mates with the valve seat in the orifice.

In some examples, the retaining means comprises an engaging portion adapted to rotatably engage with a retainer, the engaging portion being attached to one of the sealing or opposing ends and the retainer being attached to the other of the sealing or opposing ends, the step of releasing the valve from the compressed state comprises rotating the sealing end such that the retainer disengages with the engaging portion.

In some examples, the engaging portion comprises a hook.

In some examples, the step of releasing the valve from the compressed state comprises engaging a receiving means on an outer face of the sealing end with a tool and rotating the tool until the retainer releases the engaging portion.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF DRAWINGS

Examples of the present disclosure will now be described further, with reference to the accompanying drawings.

DETAILED DESCRIPTION

Before discussing the examples in any more detail, first an overview will be provided.

The valve is configured for insertion into a pump inter-stage cavity in a stator in one example in a clamshell stator. The interstage is hollow with a wall facing towards the upstream stage and another wall facing towards the downstream stage. The valve is configured to open or close a pressure relief flow path from the outlet portion of the upstream stage back to the inlet portion of the upstream stage in cases of raised pressure at the outlet portion of the upstream stage, thereby protecting the downstream stage(s) from these pressure rises.

The valve seat is formed in the pressure relief flow path and in some examples at one end of this flow path in one of the walls. A region of the cavity between the walls provides the pressure relief flow path to return the gas to the inlet of the same stage.

In examples, the valve has a plunger, spring, and guide/support.

Figure 1:
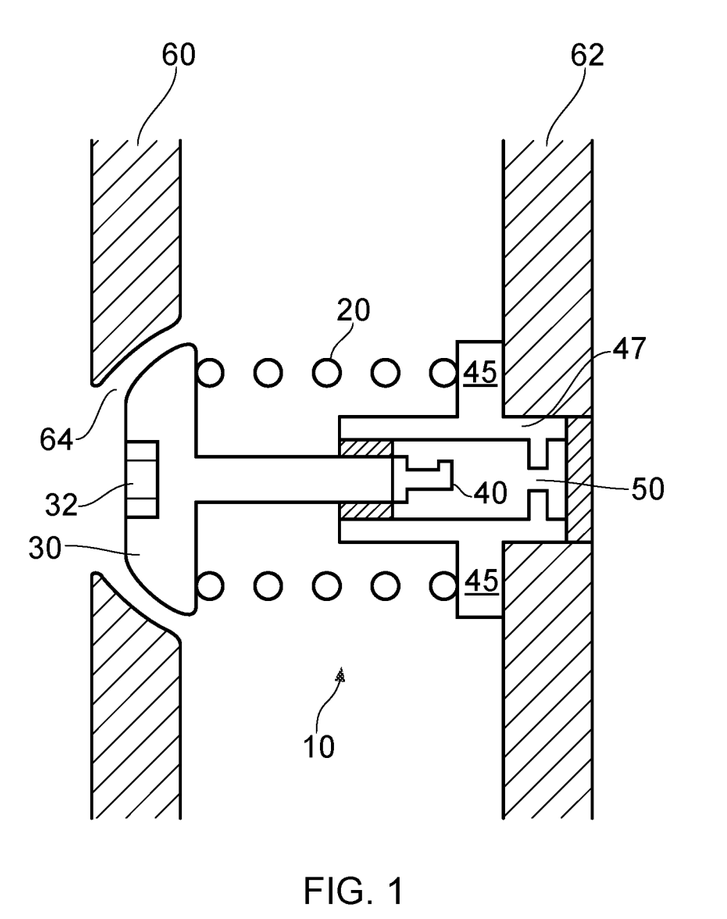
FIG. 1 shows a relief valve according to a first example.

FIG. 1 shows a valve assembly according to a first example. The valve assembly 10 is shown in the elongated state between an upstream wall 60 and a downstream wall 62 of the interstage cavity.

The valve assembly is configured such that it can be locked into a compressed state by pushing on valve plunger 30 and compressing the spring 20, when the spring 20 is compressed, plunger 30 can be rotated using a tool in depression 32 so that a hook 40 on the end of the valve stem is retained in an asymmetrical slot 50 in the guide/support 47. In this state the whole assembly is small enough to slide in the cavity between the interstage walls 60, 62.

The valve assembly is manoeuvred to its location opposite the valve seat opening which comprises an orifice 64 in upstream wall 60, the orifice comprising the valve seat. The support end 47 of the valve assembly is located in a depression in the downstream wall 62, and then when in position the plunger 30 can be rotated in the opposite direction to release hook 40 from slot 50 so that the valve moves to its elongated, closed position with the valve plunger 30 sealing with the valve seat in orifice 64. In this position the valve assembly is held in place.

Protrusions 45 extend out from valve support 47 and act to stabilise the valve assembly against lateral or angular movement helping retain it securely in place. When there is a rise in pressure in the upstream stage above a predetermined amount, then the force on plunger 30 is sufficient to compress spring 20 and the plunger 30 moves away from the valve seat in orifice 64 and a pressure relief flow path is opened. When the pressure in the upstream stage falls below this critical value then the valve will close again sealing the pressure relief path.

Figure 2:
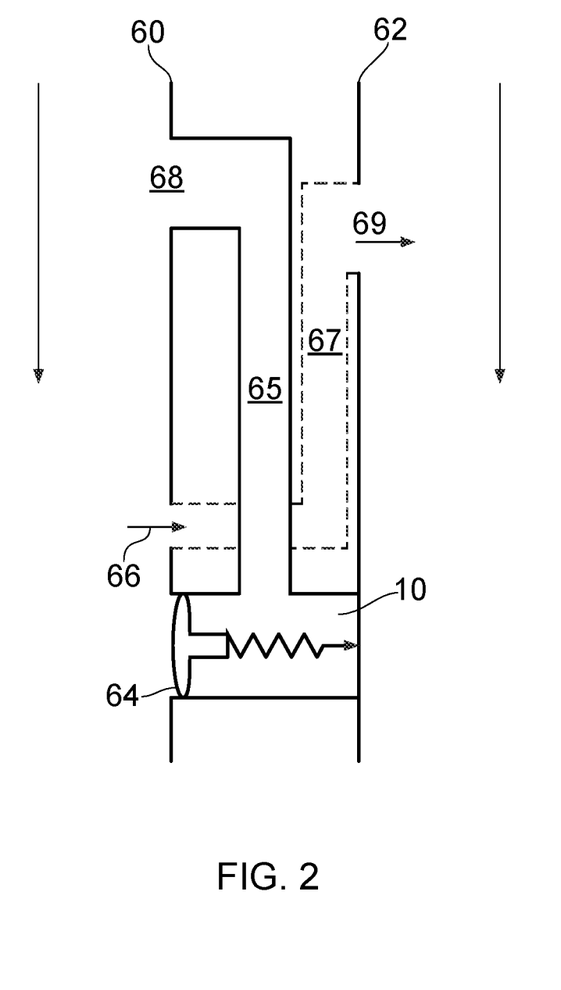
FIG. 2 shows a section through the pump showing the position of the relief valve according to FIG. 1.

To remove the valve for servicing or cleaning, the plunger 30 is pushed back towards the guide/support 47, via the seat opening 64, then rotated using depression 32 such that the hook 40 re-engages with slot 50. Once locked in the compressed state the valve can be easily withdrawn from the interstage FIG. 2 shows schematically the interstage walls 60, 62 of the interstage cavity with the different flow paths. There is a pressure relief flow path 65 sealed by a valve assembly 10 according to the example of FIG. 1. The pressure relief flow path extends from orifice 64 in the outlet portion of the upstream pumping stage to an orifice 68 in the inlet portion of the upstream pumping stage. The orifice 64 comprises the valve seat for the valve assembly 10. There is a separate pumping flow path 67 flowing from orifice 66 in the outlet portion of the upstream pumping stage to orifice 69 in the interstage wall 62, orifice 69 providing access to the inlet portion of the downstream stage. The two flow paths 65 and 67 are isolated from each other. They may have different forms within the cavity, provided that the two flow paths are bounded in some way so that they are isolated from each other.

In another example not shown the pressure relief valve is a blow off valve as opposed to a recirculating pressure relief valve, and in this case the pressure relief path 65 will not extend to an orifice 68 in the inlet portion of the upstream pumping stage but will rather extend to an orifice into an exhaust passage of the pump.

Figure 3:
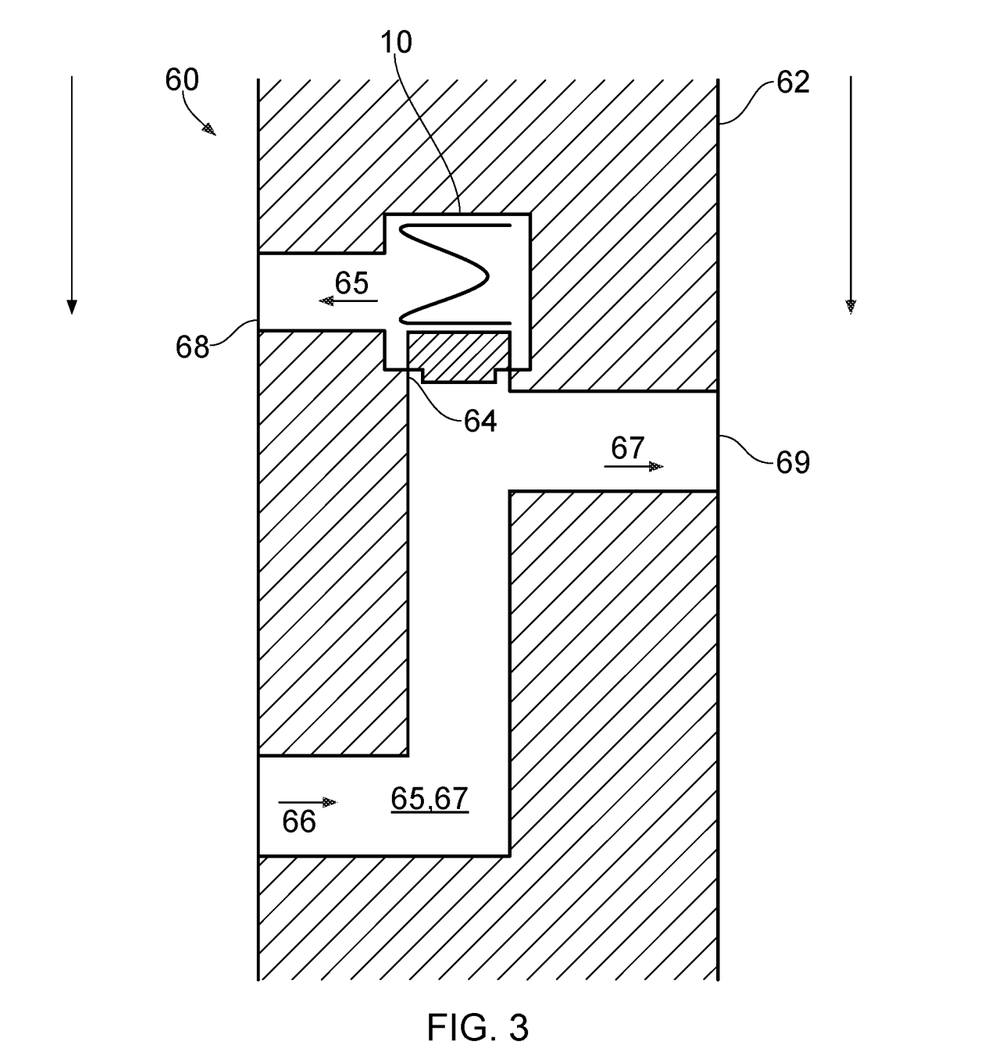
FIG. 3 shows a relief valve according to a further example.

FIG. 3 schematically shows an alternative example, where pumping flow path 67 and pressure relief flow path 65 share a same path for the initial part of the flow path from an orifice 66 in the outlet portion of the upstream wall.

The two paths diverge at orifice 64 which comprises a valve seat and mates with the plunger or sealing end of valve assembly 10. The valve assembly acts to open or close the portion of pressure relief path 65 downstream of the orifice 64 which portion leads to orifice 68 in the inlet portion of the upstream stage of the pump. The pumping flow path 67 proceeds to an outlet 69 leading to the inlet portion of the downstream stage.

In this example the valve and orifice are within the fluid flow path and the valve assembly does not contact the interstage walls. As for the valve assembly 10 of FIGS. 1 and 2, this valve assembly has a spring and retaining means (not shown), such that the spring can be compressed and then the valve assembly retained in the compressed state for removal from the pump. Similarly it can re-inserted into the pump in the compressed state and rotation of the valve plunger can lead to release of the retaining means and the valve reaching its elongated state in which state it mates with the orifice.

In this example there is a depression in the fluid flow path for retaining the support end of the valve assembly 10.

As for the example of FIG. 2 there is an alternative arrangement for this pressure relief valve (not shown) in which the valve acts as a blow off valve and in this case pressure relief path 65 does not extend back to the inlet portion of the upstream pumping stage but rather extends to an exhaust passage of the pump.

Figure 4:
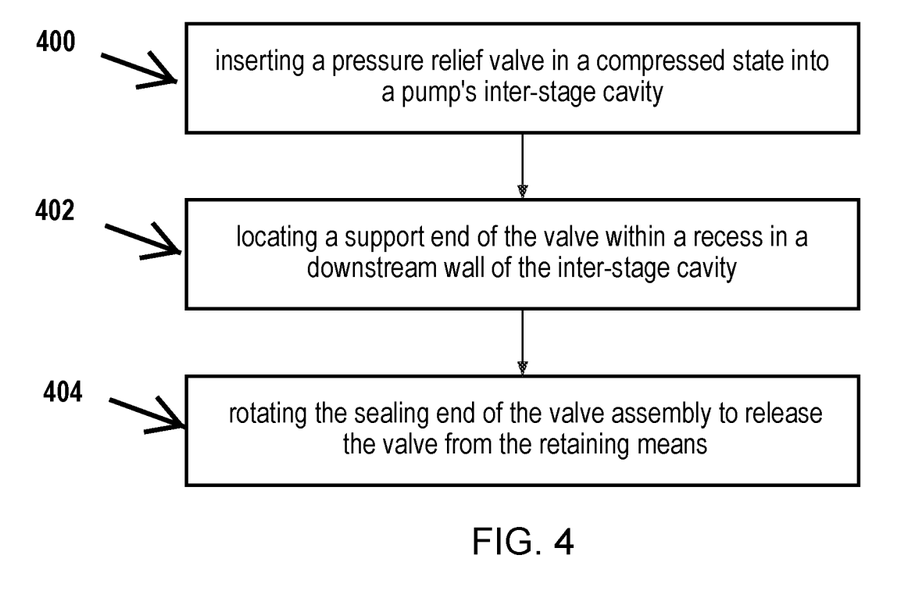
FIG. 4 shows a flow diagram illustrating steps in a method of assembling a valve within a pump according to an example.

FIG. 4 shows a flow diagram illustrating steps in a method of inserting a pressure relief valve into a pump according to an example. In this method the valve assembly is placed in a compressed state, and in this state it is inserted into an interstage cavity located between the walls of adjacent pumping chambers (400). A support end of the valve is located within a recess in a downstream wall of the interstage cavity (402) and the sealing end of the valve is rotated to release the retaining means (404) such that the valve moves to an elongated state and the sealing means seals with a sealing face on an orifice within the pump. the valve assembly is held in place by the spring force between the orifice and the recess.

Figure 5:
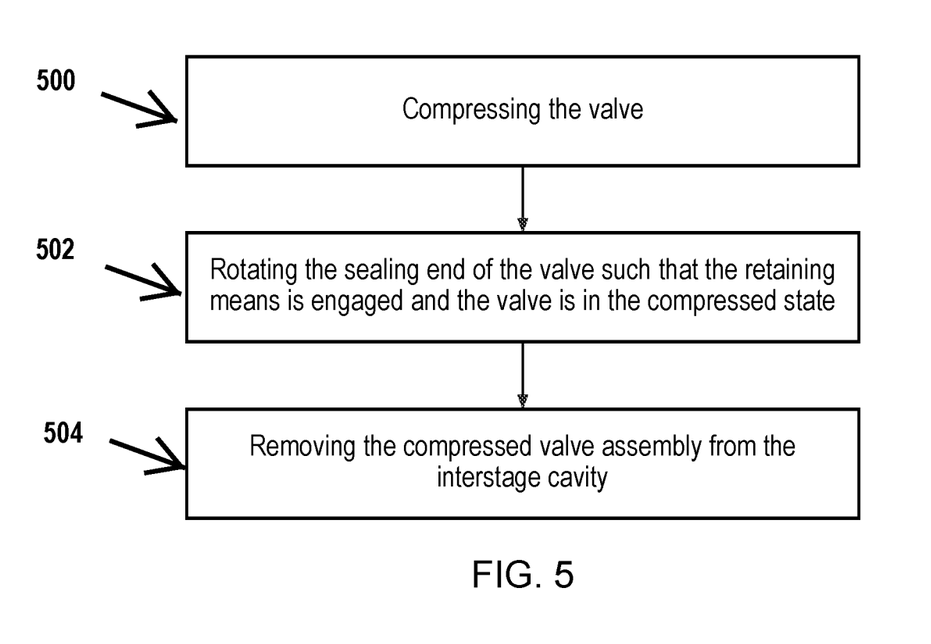
FIG. 5 shows a flow diagram illustrating steps in a method of removing a valve assembly from the pump.

FIG. 5 shows a flow diagram illustrating steps in a method for removing a valve assembly from an inter-stage cavity of a pump in order to service or replace the valve. In this method, the valve assembly is compressed (500) and the sealing end of the valve is rotated such that retaining means on the valve assembly are engaged and the valve assembly is held in the compressed state (502). In this state the valve assembly can be removed from the interstage cavity (504).

Figure 6:
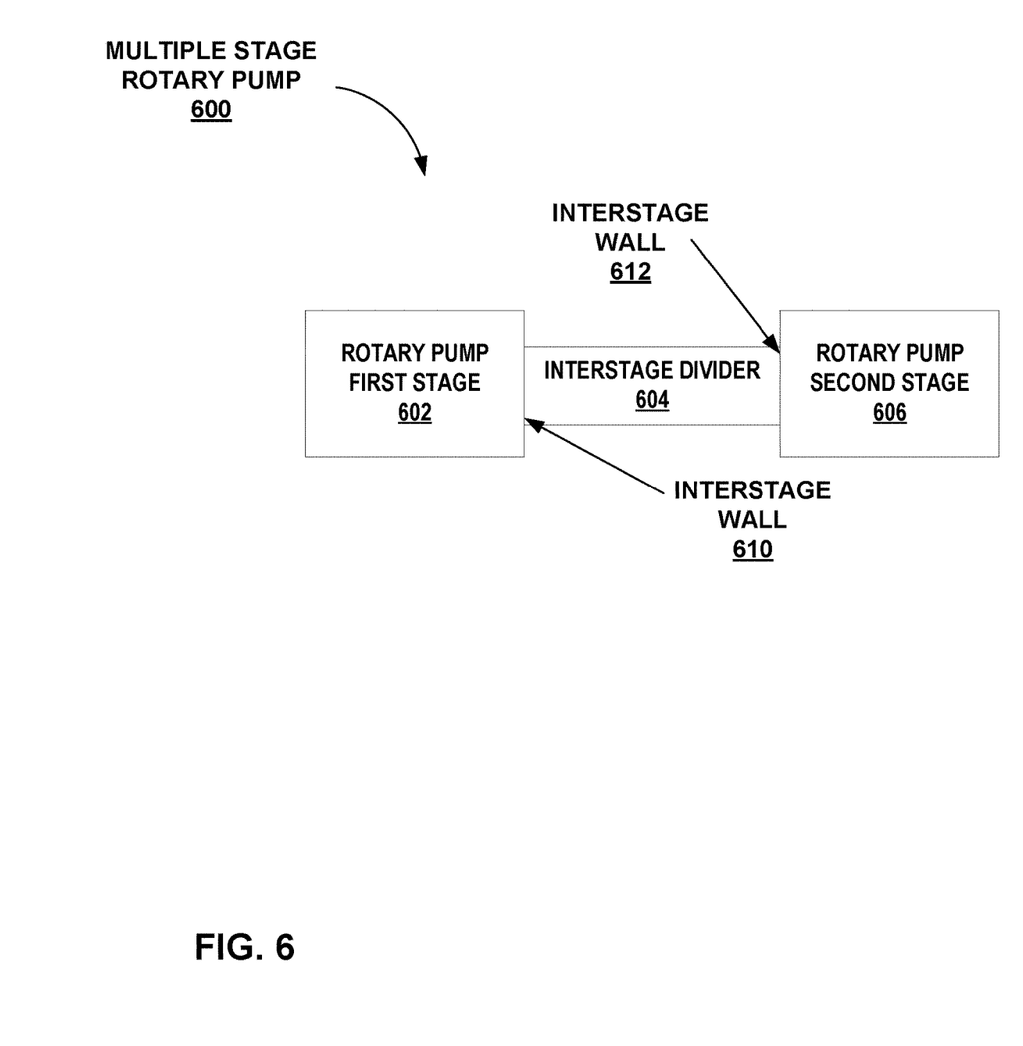

FIG. 6 is a conceptual diagram illustrating a multiple stage rotary vacuum pump. The multiple stage rotary vacuum pump 600 in the example of FIG. 6 includes a first stage 602, second stage 606 and an inter-stage divider 604 separating the two adjacent pumping stages. The inter-stage divider includes two walls 610 and 612, which are examples of walls 60 and 62 described above in relation to FIGS. 1-5.

Although illustrative examples of the disclosure have been disclosed in detail herein, with reference to the accompanying drawings, it is understood that the disclosure is not limited to the precise example and that various changes and modifications can be effected therein by one skilled in the art without departing from the scope of the disclosure as defined by the appended claims and their equivalents.

FIG. 6 is a conceptual diagram illustrating a multiple stage rotary vacuum pump. The multiple stage rotary vacuum pump 600 in the example of FIG. 6 includes a first stage 602, second stage 606 and an inter-stage divider 604 separating the two adjacent pumping stages. The inter-stage divider includes two walls 610 and 612, which are examples of walls 60 and 62 described above in relation to FIGS. 1-5.

The invention claimed is:

1. A multiple stage rotary vacuum pump comprising:
a stator comprising multiple pumping stages;
at least one inter-stage divider separating two adjacent pumping stages;
the at least one inter-stage divider comprising two walls defining a cavity therebetween, an upstream wall bounding an upstream pumping stage and a downstream wall bounding a downstream pumping stage of the two adjacent pumping stages;
the cavity comprising at least a portion of a pressure relief fluid flow path, the pressure relief fluid flow path providing a path from an outlet portion of the upstream stage towards an inlet portion of the upstream stage or towards an exhaust, the pressure relief fluid flow path comprising an orifice, the orifice comprising a valve seat; and
a pressure relief valve configured to move between a compressed and an elongated state, the pressure relief valve sealing the orifice when in the elongated state and configured to move to the compressed state such that the orifice is not obstructed, in response to pressure in the upstream stage rising above a predetermined value, wherein the pressure relief valve comprises retaining means for releasably retaining the valve in the compressed state.

2. The multiple stage rotary vacuum pump according to claim 1, wherein an outer sealing face of the valve comprises a receiving means configured to receive a tool for rotating the outer sealing face to release or engage the retaining means.

3. The multiple stage rotary vacuum pump according to claim 1, wherein the retaining means comprises a hook and a retainer for retaining the hook, one of the hook or the retainer being attached to a fixed end of the valve and the other of the hook or the retainer to a sealing end, the valve being configured such that rotation of the sealing end of the valve engages or releases the hook from the retainer.

4. The multiple stage rotary vacuum pump according to claim 1, wherein the orifice is located in one wall of the inter-stage divider and comprises an outlet of the upstream pumping stage.

5. The multiple stage rotary vacuum pump according to claim 1, wherein the cavity comprises a pumping fluid flow path, the pumping fluid flow path providing a path from the outlet portion of the upstream stage towards an inlet portion of the downstream stage, the pumping fluid flow path and the pressure relief fluid flow path comprising the orifice, at a junction of the paths.

6. The multiple stage rotary vacuum pump according to claim 5, wherein a portion of the fluid flow path from the outlet portion of the upstream stage to the orifice comprises a combined pressure relief fluid flow and pumping fluid flow path.

7. The multiple stage rotary vacuum pump according to claim 1, wherein the pressure relief valve is configured to extend between the two walls, a fixed end of the valve being mounted in the downstream wall and a sealing end of the valve extending to the upstream wall when the valve is in the elongated state.

8. The multiple stage rotary vacuum pump according to claim 1, wherein the vacuum pump comprises a recess configured to receive a fixed end of the valve.

9. The multiple stage rotary vacuum pump according to claim 8, wherein protrusions extend out from said fixed end for retaining said pressure relief valve in said recess.

* * * * *